United States Patent [19]

Ohasi et al.

[11] Patent Number: 4,982,757
[45] Date of Patent: Jan. 8, 1991

[54] FUEL CUTOFF VALVE

[75] Inventors: Tamiyosi Ohasi, Aichi; Masami Mizuno, Nagoya; Tomohide Aoki, Gifu; Osamu Hokari, Kanagawa, all of Japan

[73] Assignees: Toyoda Gosei Co., Ltd., Nishikasugai; Isuzu Motors Limited, Tokyo, all of Japan

[21] Appl. No.: 422,021

[22] Filed: Oct. 16, 1989

[30] Foreign Application Priority Data

Oct. 20, 1988 [JP] Japan .................... 63-264889

[51] Int. Cl.$^5$ .................................... F16K 31/22
[52] U.S. Cl. ........................... 137/202; 137/630.14
[58] Field of Search ............ 137/202, 630.15, 630.14; 220/85 VR, 85 VS; 55/170

[56] References Cited

U.S. PATENT DOCUMENTS

| | | | |
|---|---|---|---|
| 4,209,032 | 6/1980 | Drori | 137/202 |
| 4,342,328 | 8/1982 | Matta | 137/630.15 X |
| 4,694,847 | 9/1987 | Szlaga | . |
| 4,735,226 | 4/1988 | Szlaga | . |
| 4,781,218 | 11/1988 | Mori | 137/202 |

FOREIGN PATENT DOCUMENTS 62-87274 6/1987 Japan .

Primary Examiner—Alan Cohan
Attorney, Agent, or Firm—Cushman, Darby & Cushman

[57] ABSTRACT

The fuel cutoff valve is provided which includes a case member having an outlet opening leading to a canister, and a float member disposed within the case member. The float member is provided including a valve which has a first annular seal member sealing the periphery of the outlet opening and a second annular seal member having a smaller diameter than that of the outlet opening, and a float body vertically below the values. A through hole in formed in each seal member of the valve. When the liquid fuel flows into the case and the floats member float the first seal member seals the periphery of the outlet opening. After the liquid fuel returns to the fuel tank, the valve is first opened between the second seal member having smaller diameter and the float body. Then since the valve also falls, even if the diameter of the outlet opening is large, the fuel cutoff valve will open.

22 Claims, 8 Drawing Sheets

FUEL CUTOFF VALVE

BACKGROUND OF THE INVENTION

The present invention, relates to a fuel cutoff valve 5 of the type shown in FIG. 1 disposed between a fuel tank 1 and a canister 3, where fuel evaporated in the fuel tank 1 (hereinafter referred to as "gas fuel") is allowed to pass through the valve to the canister 3, but when the fuel itself (hereinafter referred to as "liquid fuel") flows in, the gas flow is interrupted.

FIGS. 2 and 3 show a conventional fuel cutoff valve 5.

The fuel cutoff valve 5 includes a case member 7 and a float member 17.

The case member 7 is provided on its upper wall with a tapered outlet opening 9 pipe, which continues to a piping 11. The pipe 11 leads to the canister 3. An inner partition 13 is provided in case member 7 and a plurality of through holes 15 are formed therethrough.

The case member 7 communicates with the fuel tank 1 through an inlet opening 16 at the lower side of the inner partition 13.

The float member 17 is a box-shaped member and internally installed to the case member 7. A first seal member 19 of semicircular shape is formed on the upper surface of the float member 17. A compression coil spring 23 is inserted in a recess 21. The compression coil spring 23 urges the float member 17 upward.

The float member 17 is selected in its molding material so that the effective weight by substracting the biasing force of the spring 23 from the actual weight of the float member 17 is less than that of the liquid fuel having the same volume (e.g., high molecular material such as polyacetal). Consequently, when the liquid fuel flows from the fuel tank 1 into the case member 7, the float member 17 is floated.

That fuel cutoff valve 5 normally, allows the gas fuel to flow from the tank side to the canister side as shown by the arrows in FIG. 2.

When the vehicle is tilted or the like, if the liquid fuel from the tank 1 flows in, the float member 17 floats as shown in FIG. 3. Then the first seal member 19 closes the outlet opening 9, thereby the liquid fuel is not allowed to flow to the piping 11 (valve close state). If the liquid fuel is returned to the tank 1, the float member 17 falls and the valve is again opened.

SUMMARY OF THE INVENTION

It has been proposed that, as shown in FIG. 4, diameter of the pipe 12 be made larger, in comparison to that of FIGS. 2, 3. This is because during the fuel supply, the air and the gas fuel within the tank must be discharged efficiently, because the space between the fuel injection port and the fuel injection nozzle is sealed in the newer fuel tanks.

In the fuel cutoff valve 6 of FIG. 4, however, since the outlet opening 10 becomes large as diameter of the pipe 12 becomes large, the first seal member 20 has been changed in its design and molded in a ring shape on the periphery of the upper surface of the float member 18 and the seal area becomes large. Then even if the liquid fuel is returned to the fuel tank 1 and does not remain in the case member 8, the float member 18 remains in its sealing position and the valve may not open.

This is because in relation of the loads f, m applied respectively to the float member 18 in the state of FIG. 4;

f: (atmospheric pressure difference $\Delta P$ between the outlet opening 10 and the case member 8; $kg/cm^2$) × (seal area, $cm^2$), m: (self weight of the float member 18; kg) − (biasing force of the spring 23; kg), since the seal area is wide, when $\Delta P$ is large, it is liable that f>m. In this case, the float member 18 has the upward biasing force and does not fall from the state of FIG. 4.

In the fuel cutoff valve 5 of FIGS. 2, 3, since the seal area was small, relation of f and m was always f<m. Consequently, the float member 18 always fell.

Accordingly, an object of the invention is to provide a fuel cutoff valve wherein the valve will open even if the outlet opening is large.

In order to attain the foregoing object, in accordance with the invention, the float member of a fuel cutoff valve is constructed by overlaying the valve and the float body. A first seal member of ring shape closely contacted with periphery of an outlet opening is formed at the upper surface of the valve. On the other hand, a second seal member of ring shape closely contacted with the upper surface of the float body and having a smaller diameter than that of the outlet opening is formed at the lower surface of the valve. Further, a through hole for communication of the inside of the first seal member and the inside of the second seal member is formed on the valve. Thereby even if $\Delta P$ becomes large, since the seal area of the second seal member is small, the valve will open.

Another object of the invention is to precisely perform the action of the valve and the float body.

In order to attain that object in accordance with the invention, a guide means is installed so that when the float body falls the guide means engage the float body pulls the valve.

Another object of the invention is to provide a fuel cutoff valve wherein there are few parts are reduced in number and the cost is low.

In order to attain that object, in accordance with the invention, the guide member and the valve integrally formed.

Another object of the invention is for the valve opening action of the float member to be performed smoothly.

In order to attain that object, in accordance with the invention, an inner circumferential surface at a lower side of the through hole for communication between the inside of the first seal member and the inside of the second seal member a second seal is defined and is in close contact with a projection formed on the upper surface of the float body. Further, the second seal member and the float body are mede of a resin material.

DESCRIPTION OF THE PREFERRED EMBODIMENTS

Figure 1:
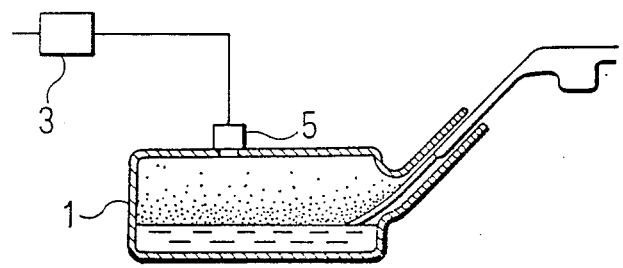
FIG. 1 is a schematic illustration of the positional relation of a fuel tank, a canister and a fuel cutoff valve.
Figure 2:
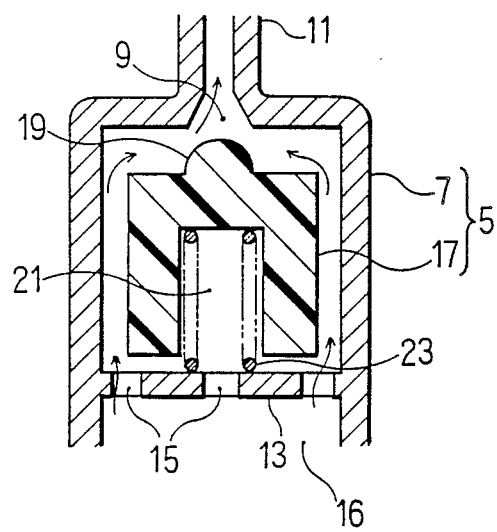
FIG. 2 is a sectional view of a conventional cutoff valve.
Figure 3:
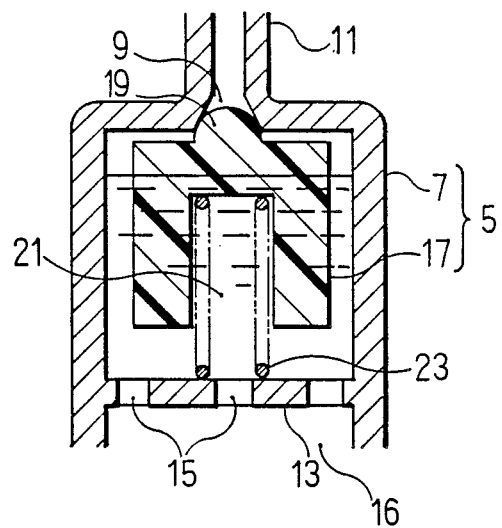
FIG. 3 is a sectional view illustrating the closed state of the conventional fuel cutoff valve.
Figure 4:
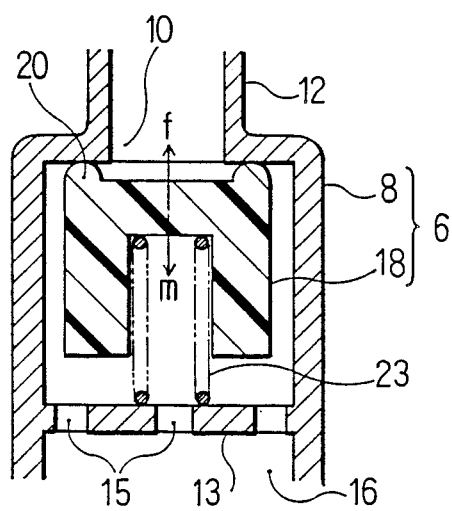
FIG. 4 is a sectional view illustrating a fuel cutoff valve in a studying example where diameter of an outlet opening is enlarged.

The invention will now be described in detail by way of example. The same parts as those described in the prior art are designated by the same reference numerals, and the description thereof is partly omitted.

First Embodiment (FIGS. 5-8)

A fuel cutoff valve 30 in this embodiment includes a case member 8 and a float member 31.

Figure 6:
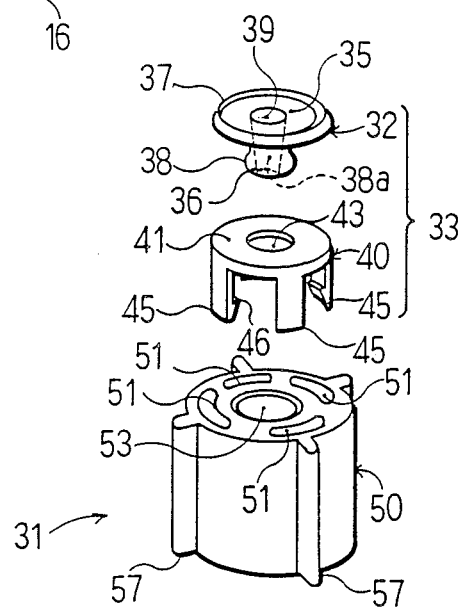
FIG. 6 is an exploded perspective view of a float member in the first embodiment.
Figure 6:
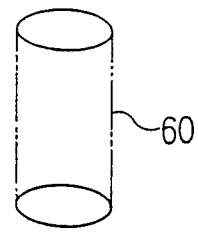

The fuel cutoff valve 30 is characterized by the float member 31. The float member 31 comprises a valve body 32, a valve guide 40 and a float body 50 overlaid as shown in FIG. 6. Numeral 60 in FIG. 6 designates a compression coil spring.

The valve body 32 includes a cover 35 and a cylinder 38. The cover 35 is of disk shape, and has larger diameter than that of an outlet opening 10. An annular rib (first seal member) 37 is formed on the periphery of the upper surface of the cover 35. The lateral cross-sectional shape of the first seal member 37 is semicircular. On the other hand, the cylinder 38 which has a smaller diameter than that of the outlet opening 10 extends from about the center of the lower surface of the cover 35. The cylinder 38 may be smaller than the outlet opening 10 at least at its lower end portion, and the lower end portion (periphery of the cylinder 38) defines a second seal member 36. A through hole 39 communicating with the center portion 38a of the cylinder 38 is formed on the center of the cover 35. The valve body 32 is formed form fluorine rubber.

A valve guide 40 is provided which includes a base portion 41 and guide legs 45. The base portion 41 is of disk shape, and a through hole 43 is defined at about the center thereof. The cylinder 38 of the valve body 32 is inserted into the through hole 43, so that the valve body 32 and the valve guide 40 are interconnected. The valve body 32 and the valve guide 40 define a valve 33. Four guide legs 45 extend from the periphery of the base portion 41 downwardly, and inwardly directed 46 provided at the lower end portions of the guide legs 45. The valve guide 40 is formed from polyacetal.

The float body 50 is a cylindrical member, and provided at its upper surface with four deep recesses 51 formed on the same circumference and a shallow recess 53 formed at the center. The guide legs 45 of the valve guide 40 are inserted in the four deep recesses 51. Each pawl 46 of the guide leg 45 can be engaged with a projection 52 formed on an upper circumferential wall of the recess 51.

The distance between the pawl 46 and the projection 52 is smaller than the distance that the float member 31 can be moved in the vertical direction. Consequently, if the float body 50 falls from the state of FIG. 7, the pawl 46 and the projection 52 are engaged as shown in FIG. 8.

The shallow recess 53 supports the lower end portion of the cylinder 38. Four fins 57 are formed on the outer circumferential surface of the float body 50 (see FIG. 6). The fins 57 serve to prevent the float body 50 from becoming offset with respect to the case member 8, and diameter of the imaginary circle connecting apexes of the fins 57 is selected to be nearly equal to the inner diameter of the case member 8. The float body 50 is also formed from polyacetal.

The compression coil spring 60 is inserted to a recess 55 formed in the lower surface of the float body 50, and urges the float body 50 upward. Thereby the virtual specific gravity of the float member 31 becomes smaller than that of the fuel.

Next, action of the fuel cutoff valve 30 will be described.

Figure 5:
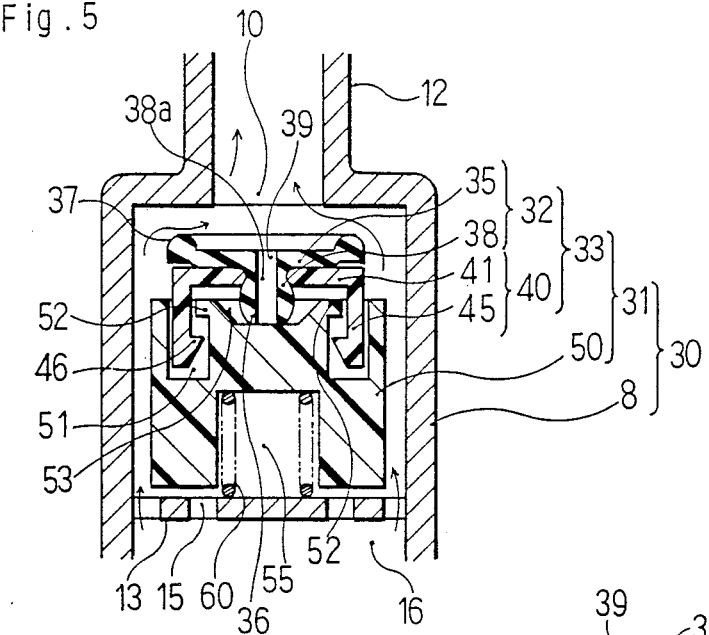
FIG. 5 is a sectional view of a fuel cutoff valve as a first embodiment of the invention.

The fuel cutoff valve 30 normally allows the gas fuel to flow from the tank side to the canister side as shown by the arrows in FIG. 5.

Figure 7:
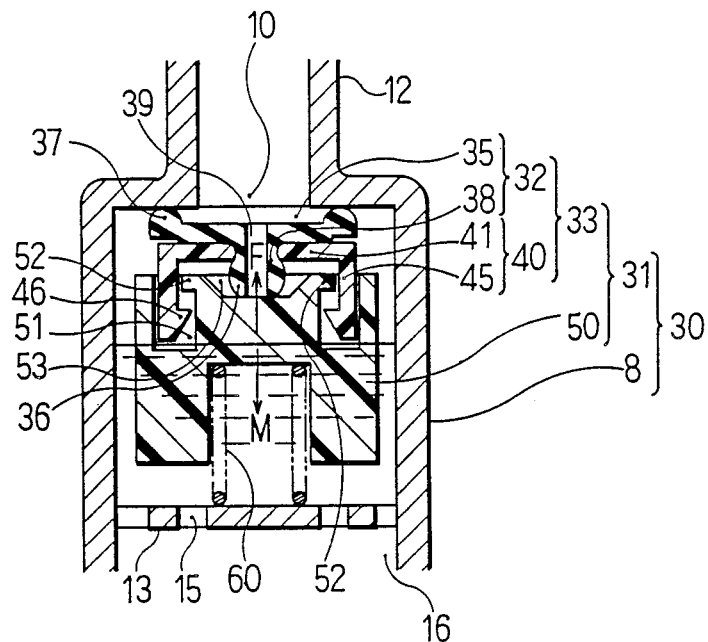
FIG. 7 is a sectinal view illustrating the closed state of the fuel cutoff valve in the first embodiment.
Figure 8:
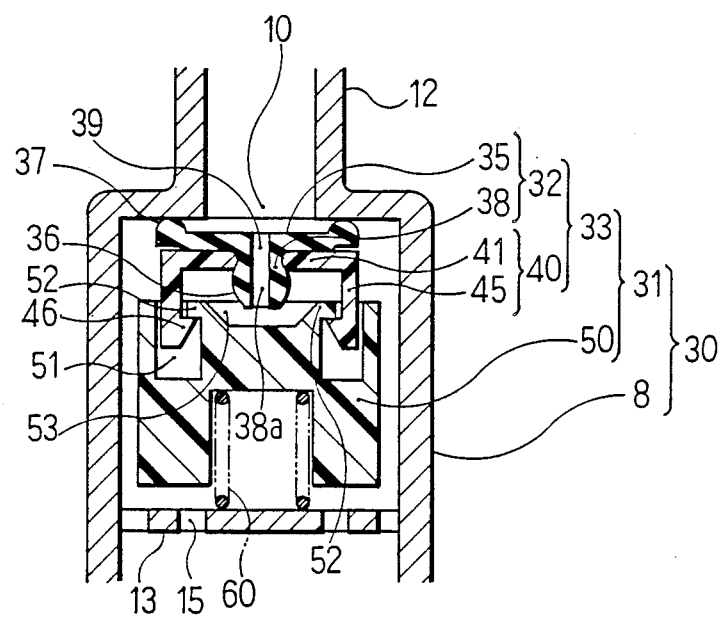
FIG. 8 is a sectional view illustrating the opening action of the fuel cutoff valve in the first embodiment.

When the vehicle is tilted, if the liquid fuel flows from the tank 1 into the case member 8, the float member 31 is floated as shown in FIG. 7. Then the first seal member 37 seals the periphery of the outlet opening 10, and prevents the liquid fuel from flowing to the canister side. The seal pressure is obtained by the buoyancy of the float member 31. Regarding the through hole 39 and the hollow portion 38a of the cylinder 38, the lower end portion (the second seal member 36) of the cylinder 38 abuts on the float body 51 to effect a seal. The seal pressure is obtained by the buoyancy of the float body 50.

If the liquid fuel flows back and returns to the fuel tank 1, normally (atmospheric pressure difference $\Delta P$ between the output opening 10 and the case member 8 being zero), the valve body 32, the valve guide 40 and the float body 50 which form the float member 31 fall together thereby opening the valve.

On the other hand, when the inner pressure of the case member 8 is higher than that of the outlet opening 10, the entire float member 31 as whole may not fall because valve body 32 includes the first seal member 37 which has large seal area. However, the contact area between the lower end portion (the second seal member 36) of the cylinder 38 of the valve body 32 and the float body 50 is smaller than the contact area of the first seal member 37 since the cylinder 38 has a smaller diameter than that of outlet opening 10. Consequently, in the state of FIG. 7 where there is no liquid fuel present, the loads F, G acting on the float body 50 respectively;

F: (atmospheric pressure difference between the piping 12 and the case member 8; $kg/cm^2$)×(seal area; $cm^2$), G: (self weight of the float body 50; kg)−(biasing force of the spring 60; kg), scarcely satisfy relation that F>G. Consequently, the valve always changes from the configuration of FIG. 7 to the configuration of FIG. 8, and the valve opening action is performed between the lower end portion (the second seal member 36) of the cylinder 38 and the float body 50, the outlet opening 10 communicates with the inside of the case member 8.

In order to perform such action, each part is designed as follows.

area of the first seal member 37 closely contacting with the periphery of the oulet opening 10 . . . S1 area of the second seal member 36 closely contacting with the upper surface of the float body 50 . . . S2 the downward load applied to the valve 33 when the liquid fuel is not present in the case member 8 (equal to the self weight of the valve 33) . . . g the downward biasing force applied to the float body 50 when the liquid fuel is not present in the case member 8 (equal to (the self weight of the float body 50)—(the biasing force of the spring 60), but equal to the self weight of the float body 50 when the spring 60 does not exist) . . . G $$G/S2 > (g+G)/S1 \quad \text{(formula 1)}$$

is satisfied.

This inequality is introduced as follows.

Assuming that the valve 33 and the float body 50 are an integral body, if the minimum atmospheric pressure difference ((atmospheric pressure of the case member 8)—(atmospheric pressure of the outlet opening 10), hereinafter referred to as "atmospheric pressure difference at the balanced state") to maintain the integral body in the floated state shown in FIG. 7 (the liquid fuel is not present) is made $\Delta P1$, the relation of $$\Delta P1 \times S1 = g + G \quad \text{(formula 2)}$$

applies.

On the other hand, as in the embodiment, when the valve 33 and the float body 50 can be moved respectively, if the atmospheric pressure difference at the balanced state for the float body 50 to contact with the valve 33 is made $\Delta P2$, relation of $$\Delta P2 \times S2 = G \quad \text{(formula 3)}$$

applies.

Solving formula 2 and formula 3, $$\Delta P1 = (g+G)/S1 \quad \text{(formula 22)}$$

$$\Delta P2 = G/S2 \quad \text{(formula 33)}$$

In this case, in order for the float body 50 to falls with the relation of $\Delta P2 > \Delta P1$ applies to the atmospheric pressure difference at each balanced state. Consequently, the formula 1 is introduced. In this embodiment, S1 = 1.33 cm²
S2 = 0.16 cm²
g = 0.8 g
G = 2.0 g ((the float body; 9.2 g)—(the biasing force of the spring 60; 7.2 g))

When the float body 50 falls as shown in FIG. 8, since the atmospheric pressure in the case member 8 becomes equal to the atmospheric pressure in the piping 12, the valve 33 falls by its own weight. Thereby the state of FIG. 5 is restored. Since the projection 52 and the pawl 46 of the guide leg 45 are engaged, the load G is also added and there is little time difference between the falling of the float body 50 and the falling of the valve body 32 and the valve guide 40.

In the above description, material from which each member is formed is not particularly limited as long as it has oilproof property.

If the specific gravity of each member to forming the float member 31 is less than of the liquid fuel, the spring 60 may be eliminated.

Further, the valve guide 40 may be omitted.

Second Embodiment

Figure 9:
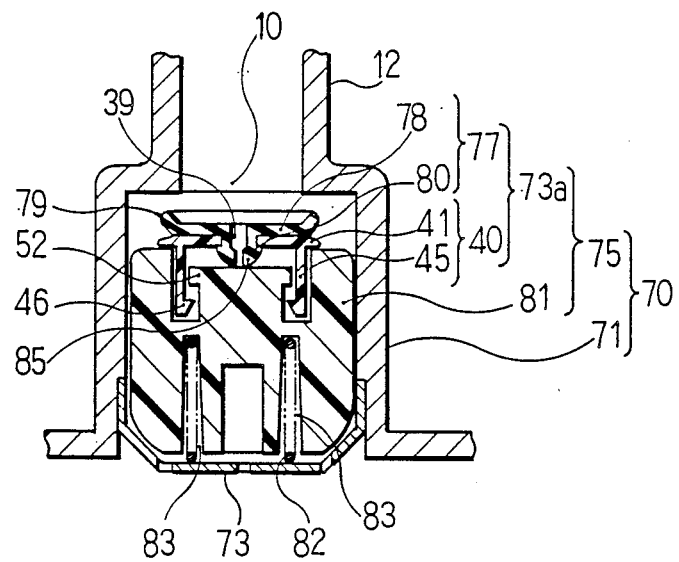
FIG. 9 is a sectional view of a fuel cutoff valve as a second embodiment.

FIG. 9 shows a fuel cutoff valve 70 of another embodiment. The same parts as those of the foregoing embodiment are designated by the same reference numerals, and the description thereof shall be partly omitted.

In case member 71 of the fuel cutoff valve 70, an inner partition 73 is made of separate material. The inner partition 73 is a band-shaped member having nearly the same width as that of a spring 82. Also in float member 75, a first seal member 79 of a valve body 77 is formed by bending the periphery of a cover 78. Numeral 80 designates a cylinder, and numeral 85 designates a second seal member. In a float body 81, a recess 83 of circular ring shape is formed to which a compression coil spring 82 is to be inserted. Thereby the guide function of the spring 82 to the float body 81 is improved.

In the fuel cutoff valve 70 of this embodiment, a valve 73a to which includes the valve body 77 and a valve guide 40 and a float body 50 satisfies the requirements of formula 1, described above. Consequently, the fuel cutoff valve 70 performs in a manner similar to that of the first embodiment.

Figure 10:
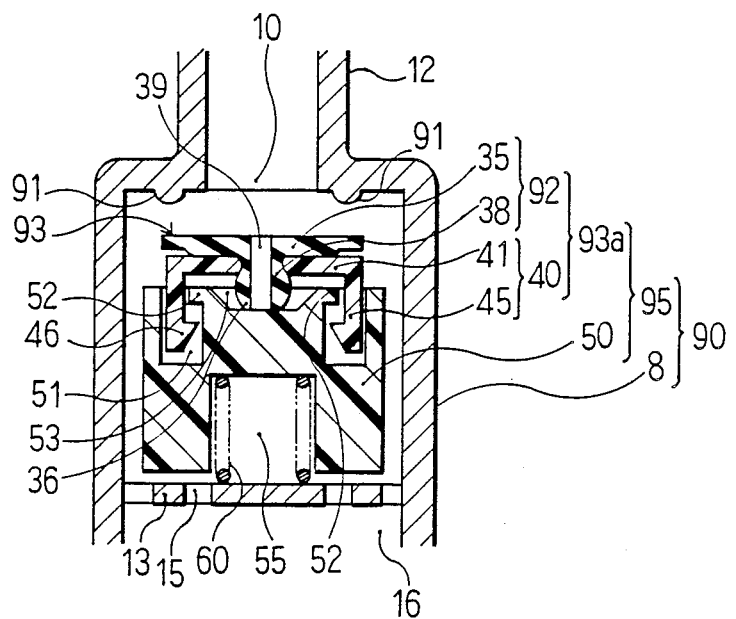
FIG. 10 is sectional view of a fuel cutoff valve as a third embodiment.

Third Embodiment (FIG. 10)

A fuel cutoff valve 90 in this embodiment formed from the fuel cutoff valve of FIG. 5 where a rib 91 with a semicircular lateral cross-sectional shape formed on the periphery of an upper opening 10. Thereby a rib on an upper surface of cover 35 is omitted. In this case, the periphery of the upper surface of the cover 35 becomes a first seal member 93. Of course, the rib 91 may be a separate member from case member 8. Numeral 95 in FIG. 10 designates a float member.

In the fuel cutoff valve 90 of this embodiment, a valve 93a which includes a valve body 92 and a valve guide 40 and a float body 50 satisfies the requirements of formula 1, described above. Consequently, the fuel cutoff valve 90 performs a function similar to that of the first embodiment.

Figure 11:
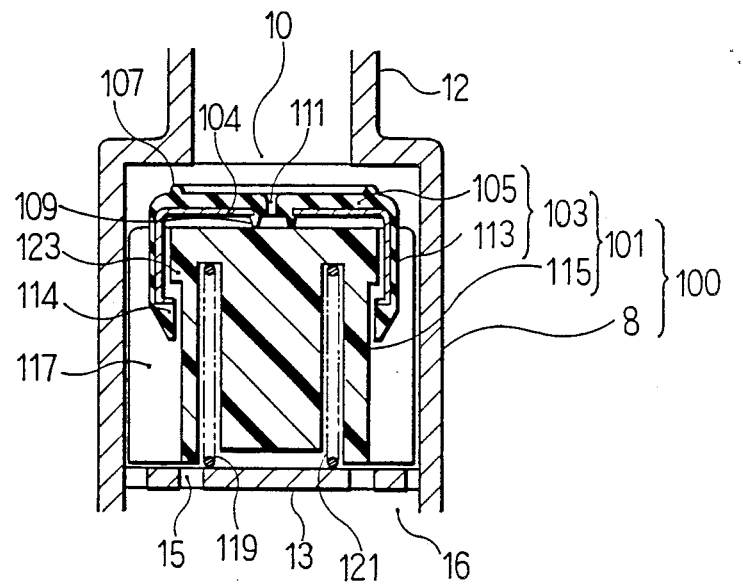
FIG. 11 is sectional view of a fuel cutoff valve as a fourth embodiment.

Fourth Embodiment (FIG. 11)

The fuel cutoff valve 100 of this embodiment includes a case member 8 and a float member 101.

The float member 101 is constructed by a valve 103 and a float body 115.

The valve 103 is provided with a cover 105 and a locking guide leg 113. The cover 105 is of disk shape, and has a first seal member 107 extending from its upper surface and a second seal member 109 extending from its lower surface. Both seal members 107, 109 are annular ribs. The first seal member 107 has a diameter larger than that of outlet opening 10 so as to seal the periphery of the outlet opening 10. On the other hand, the second seal member 109 has a diameter smaller than that of the outlet opening 10. A through hole 111 is formed at the center of the cover 105, and the inside of the first seal member 107 communicates with the inside of the second seal member 109.

Size of the diameter of the second seal member 109 is not particularly limited as long as it is designed so that the float body falls independently during the valve open state as described with reference to the first embodiment. Also the through holes 111 can be designed in various ways (e.g., plural through holes, or a an upwardly widening taper hole) if the lower end opening of the through hole 111 is within the range of the second seal member 109. Further, a plurality of the second seal members 109 may be provided, and the through holes 111 may be formed at respective seal members 109. Also utilizing the same idea as the third embodiment, a rib is can be defined on the upper surface of the float body 115, and the rib on the lower surface of the cover 105 may be omitted.

The locking guide leg 113 extends from the periphery of the cover 105 downward. The locking guide leg 113 corresponds to the valve guide 40 in the first embodiment. For locking guide legs 113 are provided corresponding to those of the valve guide 40. A pawl 114 is formed at the lower end of the guide leg 113.

The valve 103 having the foregoing structure is formed by fluorine rubber, and has an insert 104 at the lower surface.

The float body 115 is a cylindrical member formed by polyacetal, and fins 117 for preventing the float body 115 from becoming offset are formed on the side surface. A recess 121 for inserting a spring 119 is formed in the lower surface. Also a projection 123 is formed on the outside surface. The distance between the projection 123 and the pawl 114 is less than the amount the float member 101 can move.

In the fuel cutoff valve 100 of this embodiment, the valve 101 and the float body 115 satisfy formula 1, described above. Consequently, the fuel cutoff valve 100 performs in a manner similar to the first embodiment.

In comparison to the first embodiment, the number of parts is reduced.

Figure 12:
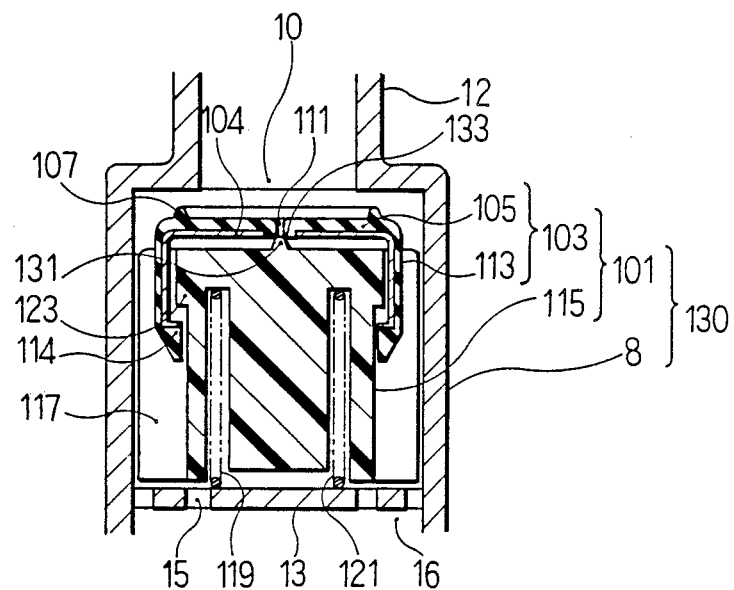
FIG. 12 is a sectinal view of a fuel cutoff valve as a fifth embodiment.

Fifth Embodiment (FIG. 12)

The fuel cutoff valve 130 of this embodiment is characterized in that the rib at the lower surface of the cover 105 in the foregoing embodiment is omitted, and a projection 131 to close the through hole 111 is formed at the upper surface of the float body 115. Consequently, the circumferential wall of the lower end opening of the through hole 111 becomes a second seal member 133.

Figure 13:
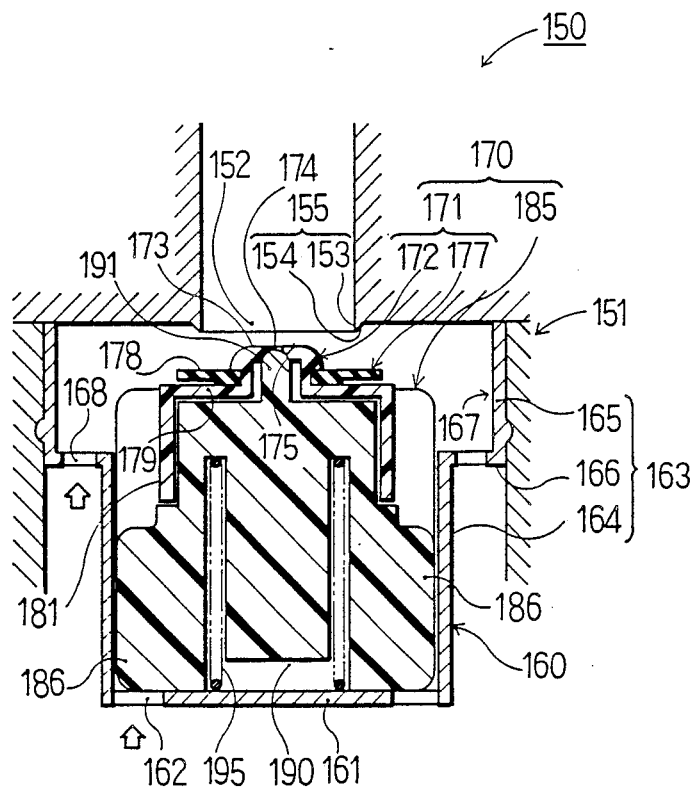
FIG. 13 is a sectional view of a fuel cutoff valve as a sixth embodiment.
Figure 14:
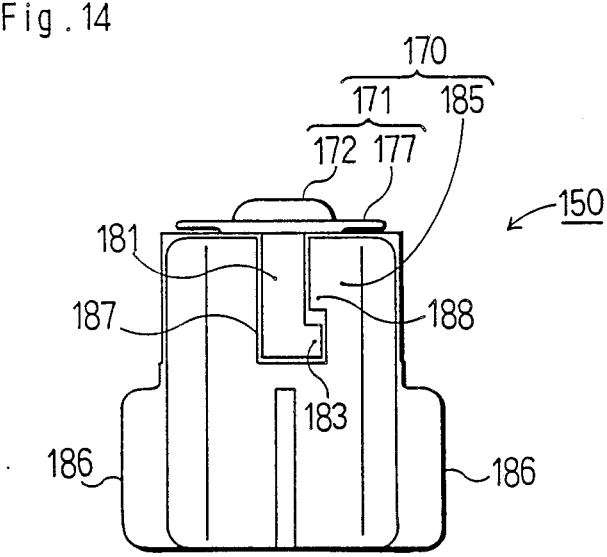
FIG. 14 is a front view of a float member in the sixth embodiment.
Figure 15:
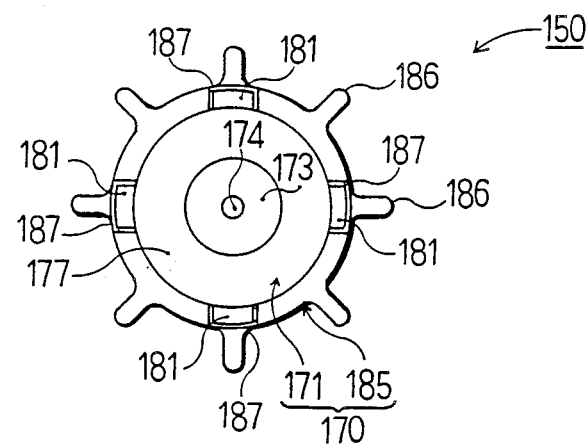
FIG. 15 is a plan view of the float member in the sixth embodiment.

Sixth Embodiment (FIGS. 13–15)

The fuel cutoff valve 130 of this embodiment includes an outside case 151, an inside case 160 and a float member 170.

An outlet opening 152 is formed on the upper surface of the outside case 151. A rib 155 defined by a vertical surface 153 flush with an inner circumferential surface of the outlet opening 152 and a slant surface 154 crossing the vertical surface 153 with an acute angle is formed on the periphery of the outlet opening 152. The rib 155 has an apex in line contact with an upper surface of a valve 171, as described below. Consequently, since the contact area between both is reduced, the valve 171 can be opened easily and the seal performance is improved.

The inside case 160 is a cylindrical member having a bottom wall 161 as a partition to support a spring 195. A side wall 163 comprises a smaller diameter portion (holding portion 164) and a larger diameter portion 165 in tight fit to the outside case 151, and both portions are connected by a horizontal step portion 166. That is, the larger diameter portion 165 and the step portion 166 define a retainer 167 which connects the holding portion 164 to the outside case 151.

A through hole 168 is bored through the step portion 166, and connects upper and lower spaces of the step portion 166, i.e., the inside of the fuel tank and the outlet opening 152. Thereby even if a large amount of gas is generated within the fuel tank, a part of the gas flows from the through hole 168 to the opening 152 directly. Consequently, since the amount of gas amount gas passing the through hole 162 bored on the bottom wall 161 is small, the float member 170 is hardly elevated.

The float member 170 includes the valve 171 and the float member 185.

The valve 171 includes a cylindrical inside portion 172 and a disk-shaped outside portion 177 mounted to the lower end of the inside portion 172. The former is made of resin, and the latter is made of rubber.

A through hole 174 is formed in an upper wall 173 of the inside portion 172. An inner circumferential surface at the lower edge of the through hole 174 defines a second seal member 175.

The upper surface of the outside portion 177 contacts rib 155 as already described. That is, a portion facing the rib 155 at the upper surface of the outside portion 177 defines a first seal member 178.

A flange 179 is formed integrally from the lower edge of the inside portion 172. Four guide legs 181 extend from the outer circumference of the flange 179 downwardly (refer to FIGS. 14, 15). A pawl 183 is formed at the lower end of each guide leg 181.

The float body 185 is a cylindrical member, and eight fins 186 are formed on the side surface thereof. The diameter of the imaginary circle connecting the apexes of the fins 186 is nearly equal to the inner diameter of the holding portion 164. Thereby the fins 186 are slidably contacted with the inner surface of the holding portion 164 and the float body 185 is prevented from becoming offset.

A groove 187 is formed in the float body 185 on a portion opposed to the guide leg 181. A projection 188 engaged with the pawl 183 is formed on a wall surface of the groove 187.

The distance between the projection 188 and the pawl 183 is less than distance the float member 170 moves. Consequently, when only the float body 170 falls from the valve closed state, the projection 188 and the pawl 183 are engaged.

The guide leg 181 is fitted to the groove 187, whereby alignment between the valve 171 and the float body 185 is effected.

A projection 191 having a spherical head is formed on the upper surface of the float body 185. The head of the projection 191 is contacted with the lower edge of the through hole 174 of the valve 171, i.e., the second seal member. A recess 190 of circular ring shape for inserting a compression coil spring 195 is formed in the lower surface of the float body 185.

Since the projection 191 is a member formed integrally with the float body 185 and made of resin, the contact of the second seal member 175 with the float body 185 is a resin-resin contact. Consequently, the contact area of both is always constant in comparison to the foregoing embodiment which had resin-rubber contact. Thus among the loads acting on the float body 185, that based on the pressure difference (F) can be expressed as a variable of the pressure difference only. Consequently, the load is stabilized, and design of the biasing force of the compression coil spring 195 and the specific gravity of the float body 185 required to perform the valve opening of the second seal member 175 is easy. As a result the valve opening action of the second seal member is stabilized.

Also in the fuel cutoff valve 150 of this embodiment, the valve 171 and the float body 185 satisfy formula 1, described above. Consequently, the fuel cutoff valve 150 performs in a manner similar to that of the first embodiment.

What is claimed is:

1. A fuel cutoff valve disposed between a fuel tank and a canister of a vehicle through which a gaseous fuel in the fuel tank is allowed to pass to the canister but through which liquid fuel is prevented from flowing, said fuel cutoff valve comprising:

a case member disposed between the fuel tank and the canister, said case member including an inlet opening in fluid communication with said fuel tank and an outlet opening in fluid communication with the canister, said outlet opening being defined vertically above said inlet opening;

a float member including a valve and a float body disposed within said case member so that said valve is defined vertically above said float body, a throughhole being defined through said valve, a first annular seal member being defined on an upper surface of said valve peripherally of an upper opening of said throughhole and sized so as to be in close contact with a periphery of said outlet opening when said valve is urged toward said outlet opening, a second annular seal member having a diameter less than a diameter of said outlet opening formed on a lower surface of said valve peripherally of a lower opening of said throughhole and in facing relation to an upper surface of said float body so as to come into close contact with said upper surface of said float body when said float body is urged against said valve, to thereby seal said lower opening of said throughhole;

said valve and said float body being engaged so as to be axially movable relative to one another by an amount which is less than a distance which said float member can move axially within said case member;

said valve including a valve body formed from an elastomer and defining said second seal member and having said throughhole defined therethrough, and a guide means fixedly coupled to said valve body, said guide means being engaged with said float body as to be movable relative thereto by a predetermined amount;

said valve body including a cover having a flat plate shape, said first seal member being defined on an outer circumference of an upper surface of said flat plate cover, said guide means being provided with a base portion of flat plate shape, said base portion of said guide means supporting a lower surface of said flat plate cover, whereby when liquid fuel flows into said case member, the valve and the float body float together and seal said outlet opening and when liquid fuel leaves said case member and returns to the fuel tank, said float body falls freely.

2. A fuel cutoff valve as defined in claim 1, wherein a hole is defined through said base portion of said guide means, said hole defined through base portion being concentric with said throughhole of said valve.

3. A fuel cutoff valve as defined in claim 2, wherein said valve body includes a cylindrical element extending vertically downwardly from said cover, said throughhole of said valve being defined through said cover and through said cylindrical element, said cylindrical element extending through said hole of said guide means, a lowermost portion of said cylindrical element defining said second seal member.

4. A fuel cutoff valve as defined in claim 2, wherein a circumferential surface is defined at a lower end of said throughhole and defines said second seal member.

5. A fuel cutoff valve as defined in claim 1, wherein a plurality of guide legs extend vertically downwardly from said base portion of said guide means at a radially outer portion thereof, each said guide leg having a pawl element defined at an end thereof, said float body being provided with a plurality of projections for engaging said pawl elements.

6. A fuel cutoff valve disposed between a fuel tank and a canister of a vehicle through which a gaseous fuel in the fuel tank is allowed to pass to the canister but through which liquid fuel is prevented from flowing, said fuel cutoff valve comprising:

a case member disposed between the fuel tank and the canister, said case member including an inlet opening in fluid communication with said fuel tank and an outlet opening in fluid communication with the canister, said outlet opening being defined vertically above said inlet opening;

a float member including a valve and a float body disposed within said case member so that said valve is defined vertically above said float body, a throughhole being defined through said valve, a first annular seal member being defined on an upper surface of said valve peripherally of an upper opening of said throughhole and sized so as to be in close contact with a periphery of said outlet opening when said valve is urged toward said outlet opening, a second annular seal member having a diameter less than a diameter of said outlet opening formed on a lower surface of said valve peripherally of a lower opening of said throughhole and in facing relation to an upper surface of said float body so as to come into close contact with said upper surface of said float body when said float body is urged against said valve, to thereby seal said lower opening of said throughhole;

said valve and said float body being engaged so as to be axially movable relative to one another by an amount which is less than a distance which said float member can move axially within said case member;

said valve including an outside portion formed of an elastomeric material and defining said first seal member on an upper surface thereof and an inside portion formed of resin, said through hole being defined through said inside portion and said inside portion definining said second seal member;

a guide means being formed integrally with said inside portion, said guide means being engaged with said float body; said outside portion having a flat plate shape, said guide means being provided with a flange of flat plate shape supporting a lower surface of said outside portion, whereby when liquid fuel flows into said case member, the valve and the float body float together and seal said outlet opening and when liquid fuel leaves said case member and returns to the fuel tank, said float body falls freely.

7. A fuel cutoff valve as defined in claim 6, wherein a plurality of guide legs extend vertically downwardly from a radially outer circumference of said flange, a pawl element being defined at an end of each said guide leg, said float body having projections defined at a radially outer circumference thereof for engaging said pawls.

8. A fuel cutoff valve as in claim 7, wherein a plurality of recesses are defined in a radially outer circumference of said float body for receiving said guide legs.

9. A fuel cutoff valve disposed between a fuel tank and a canister of a vehicle through which a gaseous fuel in the fuel tank is allowed to pass to the canister but through which liquid fuel is prevented from flowing, said fuel cutoff valve comprising:

a case member disposed between the fuel tank and the canister, said case member including an inlet opening in fluid communication with said fuel tank and an outlet opening in fluid communication with the canister, said outlet opening being defined vertically above said inlet opening;

a float member including a valve and a float body disposed within said case member so that said valve is defined vertically above said float body, a throughhole being defined through said valve, a first annular seal member being defined on an upper surface of said valve peripherally of an upper opening of said throughhole and sized so as to be in close contact with a periphery of said outlet opening when said valve is urged toward said outlet opening, said first seal member being normally open, a second annular seal member having a diameter less than a diameter of said outlet opening formed on a lower surface of said valve peripherally of a lower opening of said throughhole and in facing relation to an upper surface of said float body so as to come into close contact with said upper surface of said float body when said float body is urged against said valve, to thereby seal said lower opening of said throughhole;

said valve and said float body being engaged so as to be axially movable relative to one another by an amount which is less than a distance which said float member can move axially within said case member;

said float member having an average specific gravity greater than the specific gravity of the liquid fuel and is urged upwardly by a biasing means disposed between said float member and said case member whereby the effective specific gravity of said float member is less than the specific gravity of the fuel and wherein if $S1$=the area bounded by said first seal member, $S2$=the area bounded by said second seal member, $g$=the downward force applied to said valve when liquid fuel is absent from the case member, and that $G$=a downward biasing force applied to the float body when liquid fuel is absent from the case member, the following equation is satisfied:

$$G/S2 < (g+G)/S1$$

whereby when liquid fuel flows into said case member, the valve and the float body float together and seal said outlet opening and when liquid fuel leaves said case member and returns to the fuel tank, said float body falls freely.

10. A fuel cutoff valve as defined in claim 9, wherein said valve includes a valve body formed from an elastomer and defining said second seal member and having said throughhole defined therethrough, and a guide means fixedly coupled to said valve body, said guide means being engaged with said float body as to be movable relative thereto by a predetermined amount.

11. A fuel cutoff valve as defined in claim 10, wherein said valve body includes a cover having a flat plate shape, said first seal member being defined on an outer circumference of an upper surface of said flat plate cover, said guide means being provided with a base portion of flat plate shape, said base portion of said guide means supporting a lower surface of said flat plate cover.

12. A fuel cutoff valve as defined in claim 11, wherein a hole is defined through said base portion of said guide means, said hole defined through base portion being concentric with said throughhole of said valve.

13. A fuel cutoff valve as defined in claim 12, wherein said valve body includes a cylindrical element extending vertically downwardly from said cover, said throughhole of said valve being defined through said cover and through said cylindrical element, said cylindrical element extending through said hole of said guide means, a lowermost portion of said cylindrical element defining said second seal member.

14. A fuel cutoff valve as defined in claim 12, wherein a circumferential surface is defined at a lower end of said throughhole and defines said second seal member.

15. A fuel cutoff valve as defined in claim 11, wherein a plurality of guide legs extend vertically downwardly from said base portion of said guide means at a radially outer portion thereof, each said guide leg having a pawl element defined at an end thereof, said float body being provided with a plurality of projections for engaging said pawl elements.

16. A fuel cutoff valve as defined in claim 6, wherein said valve includes an outside portion formed of an elastomeric material and defining said first seal member on an upper surface thereof and an inside portion formed of resin, said through hole being defined through said inside portion and said inside portion defining said second seal member.

17. A fuel cutoff valve as in claim 16, wherein a projection having a semispherical upper end is defined on an upper surface of said float body and an inner circumferential surface of a lower end of said throughhole defines said second seal member, said projection being sized and disposed so as to closely contact said second seal member when said float body is urged against said valve.

18. A fuel cutoff valve as defined in claim 17, wherein said inside portion is cylindrically shaped and has an upper wall, said throughhole being defined through said upper wall, said projection being disposed within said cylindrical portion.

19. A fuel cutoff valve as defined in claim 16, wherein a guide means is formed integrally with said inside portion, said guide means being engaged with said float body.

20. A fuel cutoff valve as defined in claim 19, wherein said outside portion has a flat plate shape, said guide means being provided with a flange of flat plate shape supporting a lower surface of said outside portion.

21. A fuel cutoff valve as defined in claim 20, wherein a plurality of guide legs extend vertically downwardly from a radially outer circumference of said flange, a pawl element being defined at an end of each said guide leg, said float body having projections defined at a radially outer circumference thereof for engaging said pawls.

22. A fuel cutoff valve as in claim 21, wherein a plurality of recesses are defined in a radially outer circumference of said float body for receiving said guide legs.

* * * * *

UNITED STATES PATENT AND TRADEMARK OFFICE
CERTIFICATE OF CORRECTION

PATENT NO. : 4,982,757
DATED : January 8, 1991
INVENTOR(S) : OHASI et al.

It is certified that error appears in the above-identified patent and that said Letters Patent is hereby corrected as shown below:

Claim 9, column 11, line 64, please change the equation

"$G/S2<(g + G)/S1$" to --$G/S2>(g +G)/S1$--

Signed and Sealed this

Eleventh Day of May, 1999

Attest:

Q. TODD DICKINSON

Attesting Officer     Acting Commissioner of Patents and Trademarks